United States Patent
Tatarkiewicz

(10) Patent No.: US 10,430,161 B1
(45) Date of Patent: Oct. 1, 2019

(54) APPARATUS, SYSTEMS, AND METHODS COMPRISING TRITIUM RANDOM NUMBER GENERATOR

(71) Applicant: Jan J. Tatarkiewicz, San Diego, CA (US)

(72) Inventor: Jan J. Tatarkiewicz, San Diego, CA (US)

( * ) Notice: Subject to any disclaimer, the term of this patent is extended or adjusted under 35 U.S.C. 154(b) by 0 days.

(21) Appl. No.: 16/273,365

(22) Filed: Feb. 12, 2019

Related U.S. Application Data

(60) Provisional application No. 62/803,476, filed on Feb. 9, 2019, provisional application No. 62/655,172, filed on Apr. 9, 2018.

(51) Int. Cl.
*G06F 7/58* (2006.01)
*G01T 1/178* (2006.01)

(52) U.S. Cl.
CPC .............. *G06F 7/588* (2013.01); *G01T 1/178* (2013.01)

(58) Field of Classification Search
None
See application file for complete search history.

(56) References Cited

U.S. PATENT DOCUMENTS

| | | | |
|---|---|---|---|
| 3,445,591 A | 5/1969 | Koehler | |
| 3,790,768 A | 2/1974 | Chevalier | |
| 4,527,798 A | 7/1985 | Siekierski | |
| 4,855,690 A | 8/1989 | Dias | |
| 4,905,176 A | 2/1990 | Schulz | |
| 5,570,307 A | 10/1996 | Takahshi | |
| 5,627,894 A | 5/1997 | Albert | |
| 5,732,138 A | 3/1998 | Noll | |
| 5,987,483 A | 11/1999 | Edelkind | |
| 6,249,009 B1 | 6/2001 | Kim | |
| 8,001,054 B1 | 8/2001 | Peart | |
| 6,346,700 B1 | 2/2002 | Cunningham | |
| 6,415,309 B1 | 7/2002 | Shilton | |
| 6,430,170 B1 | 8/2002 | Saints | |
| 6,539,410 B1 | 3/2003 | Klass | |
| 6,542,014 B1 | 4/2003 | Saito | |
| 6,687,721 B1 | 2/2004 | Wells | |
| 6,697,829 B1 * | 2/2004 | Shilton | H03K 3/84 708/255 |
| 6,745,217 B2 | 6/2004 | Figotkin | |
| 7,031,991 B2 | 4/2006 | Hars | |
| 7,124,157 B2 | 10/2006 | Ikake | |
| 7,476,370 B2 | 1/2009 | Mitsugashira | |
| 8,001,168 B2 | 8/2011 | Tsuyuzaki | |
| 8,037,117 B2 | 10/2011 | Saito | |

(Continued)

*Primary Examiner* — David H Malzahn
(74) *Attorney, Agent, or Firm* — Manuel de la Cerra

(57) ABSTRACT

Disclosed herein is a true random number generator (TRNG). The TRNG includes a cavity filled with tritium and an electronic sensor constructed to detect energy from the decay of the tritium. The sensor produces a signal for the detected energy, and an amplifier amplifies the signal while a filter filters the signal. A processor (a) determines whether the signal represents decay events for tritium; (b) sets a timer to determine the time period between decay events; (c) based on the time period in step (b), assigns a value of a 0 or a 1; (d) stores the value in a memory; (e) repeats steps (b)-(d), resulting in a string of values; and (f) generates a true random number based on the string of values. This TRNG may be formed on an integrated circuit.

25 Claims, 4 Drawing Sheets

(56) References Cited

U.S. PATENT DOCUMENTS

| | | | |
|---|---|---|---|
| 9,335,972 B2 | 5/2016 | Yang | |
| 2012/0030268 A1* | 2/2012 | Liu | G06F 7/588 708/254 |
| 2018/0217817 A1* | 8/2018 | Gorfinkel | H04L 9/0852 |

* cited by examiner

APPARATUS, SYSTEMS, AND METHODS COMPRISING TRITIUM RANDOM NUMBER GENERATOR

PRIORITY APPLICATIONS

This application claims priority as the non-provisional of U.S. Provisional Application Ser. 62/655,172 filed on Apr. 9, 2018 titled "Apparatus, Systems, and Methods Comprising Tritium Random Number Generator", and also claims priority as the non-provisional of U.S. Provisional Application Ser. 62/803,476 filed on Feb. 9, 2019 titled "Apparatus, Systems, and Methods Comprising Tritium Random Number Generator", and the contents of both of these applications are incorporated herein as if fully set forth herein.

TECHNICAL FIELD

The present disclosure relates generally to true random number generators, specifically random number generator technologies utilizing the spontaneous tritium decay, as well as apparatus, systems, and methods regarding the same.

BACKGROUND

As opposed to pseudo-random number generators based on algorithms, there are true random number generator (TRNG) devices that depend on natural random processes: multiple bipolar switches, thermal noise, light scattering by dichroic mirrors, chaotic systems, or decay of radioactive nuclei. Some of these TRNG are listed in the provisional applications to which the present application claims priority, and those references are incorporated herein by reference as if fully set forth herein.

The decay of radioactive nuclei types is considered to be the most independent of environmental influences like temperature, pressure or acceleration. However, typical nuclear-based TRNGs require large-sized detectors to enable registration of particles emitted as a result of radioactive decay. Also, many nuclei used in such devices are highly radioactive and poisonous, hence dangerous to humans if the device is broken.

Therefore, a safe and small TRNG that will not expose the user to dangerous levels of radiation would be advantageous. Such a TRNG can then be used in compact personal devices.

SUMMARY

The invention disclosed herein is a true random number generator (TRNG). The TRNG includes a cavity filled with tritium and an electronic sensor constructed to detect energy from the decay of the tritium. The sensor produces a signal for the detected energy, and an amplifier amplifies the signal while a filter filters the signal. A processor (a) determines whether the signal represents decay events for tritium; (b) sets a timer to determine the time period between decay events; (c) based on the time period in step (b), assigns a value of a 0 or a 1; (d) stores the value in a memory; (e) repeat steps (b)-(d) resulting in a string of values; and (f) generates a true random number based on the string of values. The TRNG may be formed on an integrated circuit.

In step (b), the processor may further determine a first time period T1 between a first pair of decay events and a second time period T2 between a second pair of decay events. It may in step (c) compare T1 to T2 and assign the value based on the comparison. The first pair of decay events and the second pair of decay events may share a common decay event.

The processor may generate an array of true random numbers. The processor may provide one of an array of true random numbers to a cryptographic client and then delete the delivered true random number from the memory. The one of an array of true random number provided to the cryptographic client may be the oldest one in the array. When the memory is full, the processor may delete the oldest one in the array of true random numbers. The true random numbers generated may be comprised of 256 bits or 512 bits.

The volume of tritium may be less than 0.03 µL, and the maximum radioactivity of the tritium may be less than $3\times10^{-5}$ Ci. The amount of tritium may be sufficient to create at least one million decay events per second.

The amplifier may be a low noise charge-sensitive preamplifier or a pulse shaping amplifier. The timer may have a have a clock frequency of at least 1 GHz.

A personal electronic device may be constructed from the TRNG. This device may use the true random numbers to encrypt a communication channel, to render computer simulations, or to render computer gaming.

A method to generate to a true random number using tritium is also disclosed. The method includes: (a) providing a volume of tritium; (b) detecting an energy signal from the decay of the tritium; (c) determining whether the energy signal represents decay events for tritium; (d) setting a timer to determine the time period between decay events; (e) assigning a value of a 0 or a 1 based on the time period; (f) storing the value; (g) repeating steps (b)-(f) resulting in a string of values; and (h) generating an array of true random numbers based on the string of values.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Figure 1A:
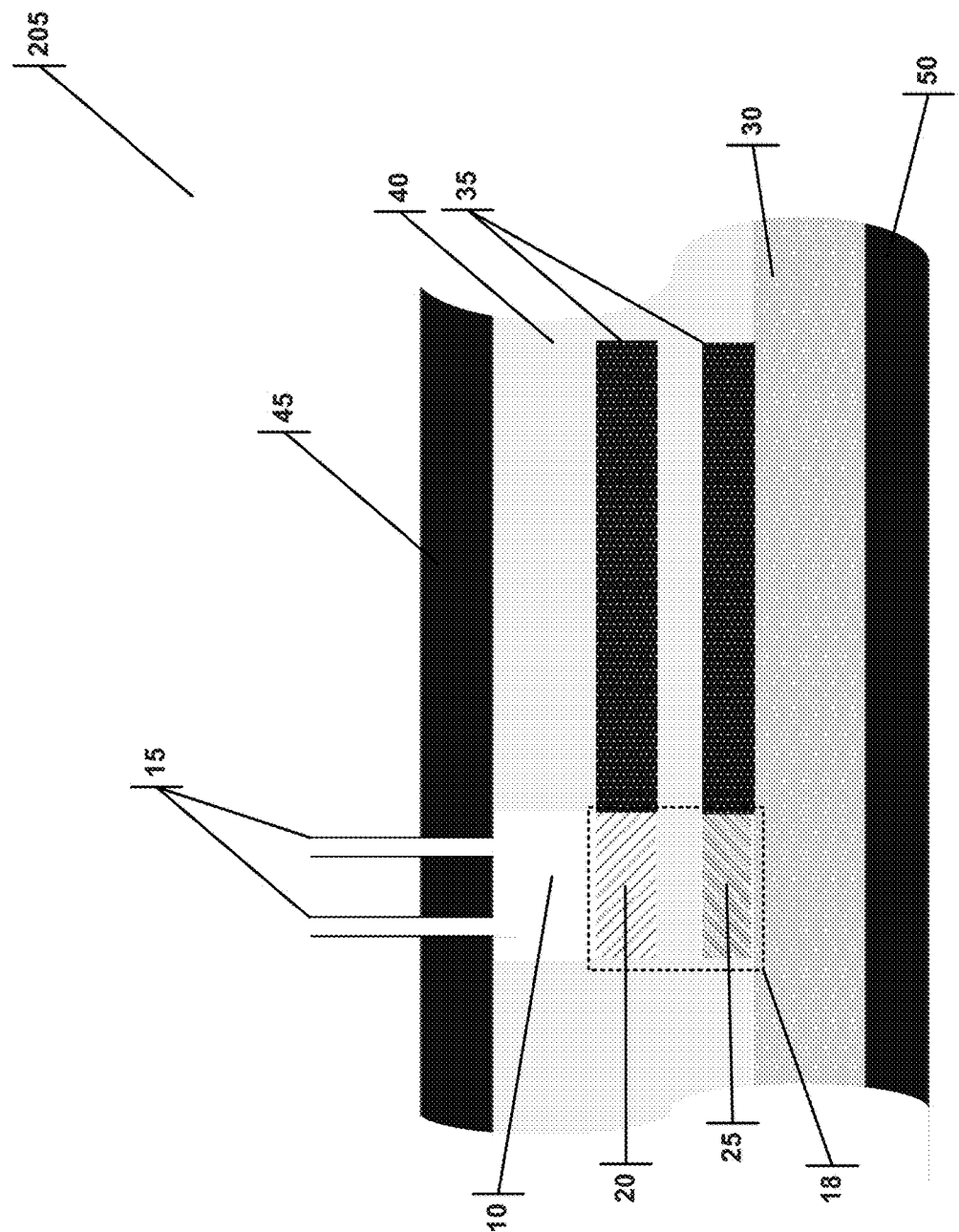
FIG. 1A is a cross-sectional view of a PIN diode detector.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with FIGS. 1-4 and is provided for ease of reference, where like reference numerals designate corresponding features throughout the specification and figures:

Cavity 10
Filler Tubes 15
PIN Diode 18
N-type silicon 20
P-type silicon 25
CCD 28
Silicon Substrate 30
Electrodes 35
Insulation 40
Upper casing 45
Lower casing 50
IC 200
Detector 205
Amplifier 210
Filter 215
Processor 220
Signal Processor 225
Timer 230
Memory 235
Cryptographical Client 240

As opposed to pseudo-random number generators based on algorithms, there are many true random number generator (TRNG) devices that depend on natural random processes: multiple bipolar switches, thermal noise, light scattering by dichroic mirrors, chaotic systems, or decay of radioactive nuclei. The latter group is considered to be the most independent of environmental influences like temperature, pressure or acceleration. However, typical nuclear-based TRNGs require large-sized detectors to enable registration of particles emitted as a result of radioactive decays. Also, many nuclei used in such devices are highly radioactive and poisonous, hence dangerous to humans if the device is broken. Various example embodiments of the present apparatus, systems, and methods demonstrate that by using gaseous tritium paired with a suitable solid-state detector, one is able to make a very compact device that can be incorporated into an integrated circuit (IC) chip. Because of the small amounts of radioactive material deployed, such an IC can be used inside consumer products like cell phones without endangering people even if the device is destroyed and the radioactive material is released. Analog and digital circuits that need to be incorporated into the proposed design of TRNG on IC chip can be easily manufactured with standard epitaxial, implantation and laser annealing procedures used throughout the industry that makes solid-state devices. As various example embodiments of the present apparatus, systems, and methods demonstrate, ICs can be filled with suitable gases after they are manufactured and already packaged; see, e.g., FIG. 1. Even with a very small amount of radioactive tritium, each such chip can generate many thousands of random bits per second. Then, these bits can be stored for later use in a solid-state memory incorporated inside ICs. Thus, such a standalone TRNG on a chip can easily provide on demand thousands of multi-byte random numbers needed for the encryption of communication channels (like voice or text messages) or for processes requiring plenty of random numbers (like simulations or gaming).

Radioactive tritium is simply an isotope of hydrogen that like hydrogen contains in each nucleus one proton with two additional neutrons. These two neutrons make tritium an unstable isotope with a half-life of about 12.3 years. Because of that short half-life, the natural abundance of tritium on Earth is only barely traceable. However, tritium can be easily produced inside nuclear reactors by neutron activation of lithium-6 or boron-10 and their subsequent, fast decay to tritium. In heavy-water moderated reactors, a deuterium nucleus that captures a neutron is also converted into tritium. Because of the use of tritium in the construction of nuclear weapons, production of that material is continued all the time, excess of the obtained gas being stored, which is also available for commercial applications. Recently there exists a whole cottage industry that produces devices that are self-illuminating like gun sights, flash-lights and jewelry. All these devices are based on the fluorescence of various fluorophores excited by electrons emitted by decaying tritium. Natural decay of tritium into helium produces electrons with the average energy of about 5.7 keV that is sufficient to excite many fluorophores and thus helps emit visible light with different colors depending on the fluorophore. Such devices use only minute amounts of tritium and are thus allowed to be sold and used by the general public. See the RoHS list of restricted materials for electronic components that do not contain tritium.

Using tritium to generate plenty of random numbers (bits or bytes) corresponding to the detection of emitted electrons allows for estimation of the amount of tritium gas needed. Let's assume that one wants to detect on average 1 million spontaneous decays of tritium per second. With the density of tritium being 6 grams per mole and the half-life of tritium being about 12.3 years or about 400 million seconds, one can estimate that to have on average 1 million decays per second, one will need an amount of about $8 \times 10^{14}$ tritium atoms. Since one mole of any substance contains about $6 \times 10^{23}$ atoms (Avogadro's number), and one mole of any gas in normal conditions has the volume of about 22.4 liters, the number of tritium atoms needed for 1 million decays per second will have the volume of about $2.9\times10^{-8}$ liters or 0.029 μL, which is equal to 0.029 mm$^3$. The latter number means that a rectangular volume restricted by dimensions of 0.3 mm×0.3 mm×0.3 mm will contain the desired amount of tritium gas that can emit about 1 million electrons every second for at least 12 years. With 1 gram of tritium gas costing about $30,000.00, the amount of gas needed for the above calculated decays will cost less than 1 cent. The dose of radiation received by a human person (if all that amount of tritium is digested or otherwise swallowed) is equal to about 7 percent of the US natural background dose (about 0.23 mSv/year vs. 3.1 mSv/year). This makes TRNG based on tritium made as per this patent application very safe indeed. These numbers are presented in the Appendix.

Figure 1B:
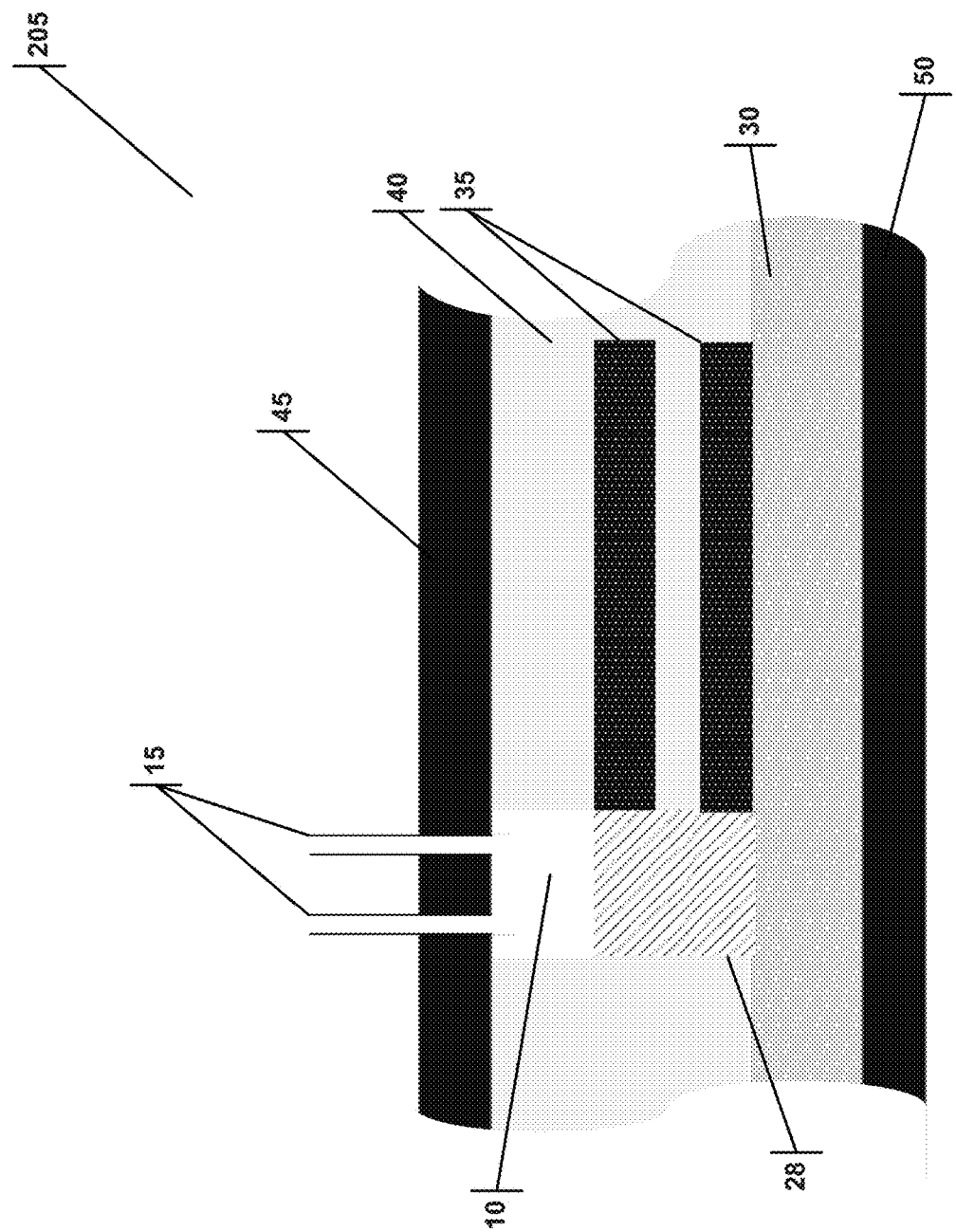
FIG. 1B is a cross-sectional view of a CCD detector.

Electrons emitted in the spontaneous decay of tritium that have on average the energy of 5.7 keV can be easily detected by a PIN diode, having heavily doped P and N semiconductor regions with an intrinsic semiconductor region sandwiched between them, or by a typical CCD circuit; both these devices can be easily incorporated into a design of a specialized IC with a TRNG. Such a detector 205 is shown in FIG. 1A. The cavity 10 is filled with tritium with the filling tubes 15. The PIN diode 18 is formed by the N-type silicon 20 and P-type silicon 25 formed on a silicon substrate 30. Electrodes 35 carry the detected signal. Insulation 40 may be used to better insulate the tritium from both escaping the cavity 10 and to contain the energy emitted by the decay so that the PIN diode 18 can more robustly detect the decay. To further protect the tritium from escaping, the entire detector 205 (indeed the entire IC 200) may have upper and lower casings 45, 50. FIG. 1B illustrates a CCD 28 used as the electronic sensor. Other types of electronic sensors may be used, including as a non-limiting example, a CMOS electronic sensor.

Figure 2:
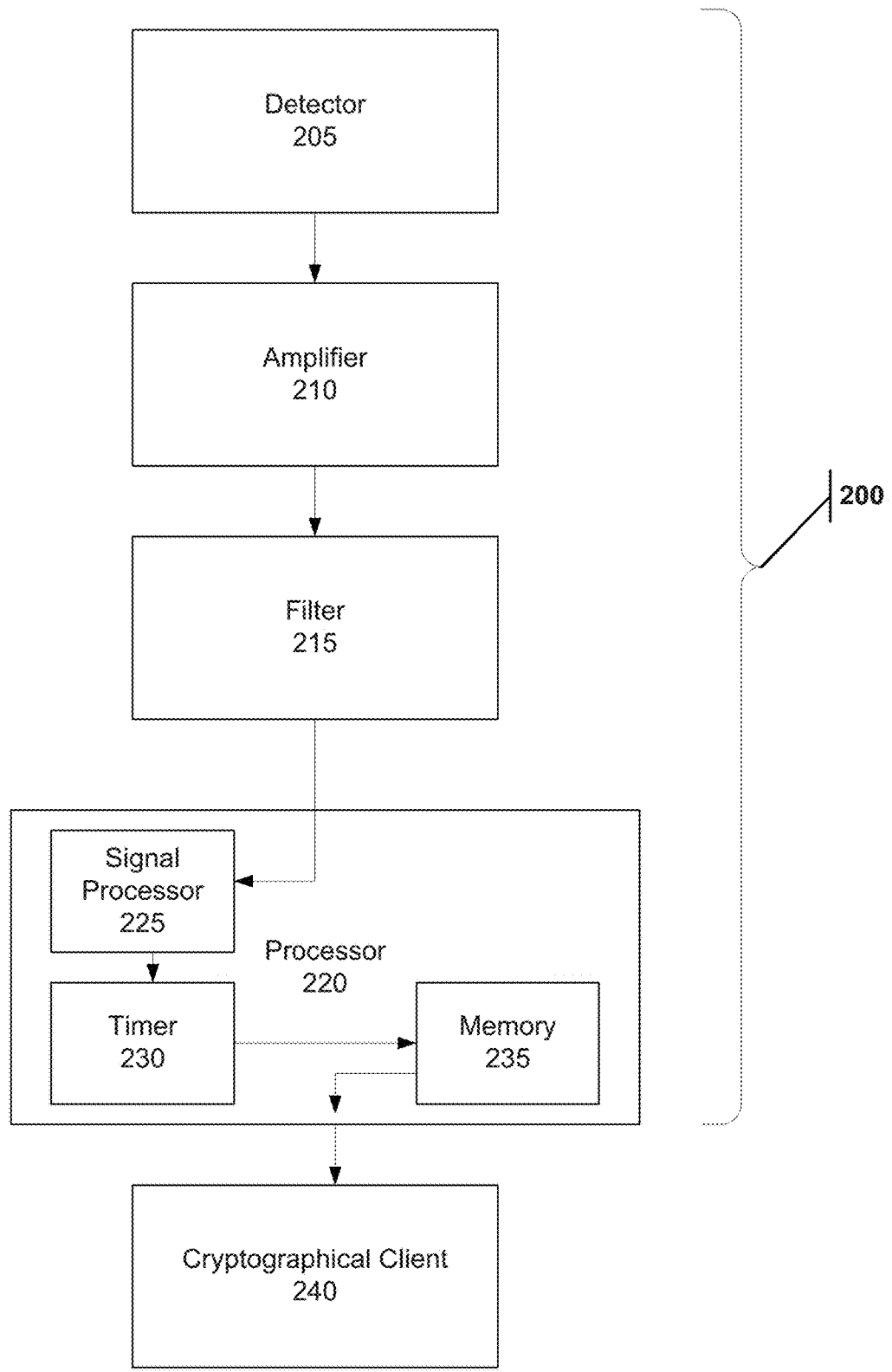
FIG. 2 is a flow diagram of the various components that may be placed on the integrated circuit.

The detector 205 may be included on an IC 200, which may further include an amplifier 210 (such as a low noise charge-sensitive preamplifier and pulse shaping amplifier), a filter 215, and processor 220, as shown in FIG. 2. A cryptographic client 240 may optionally also be on the IC 200.

Figure 3A:
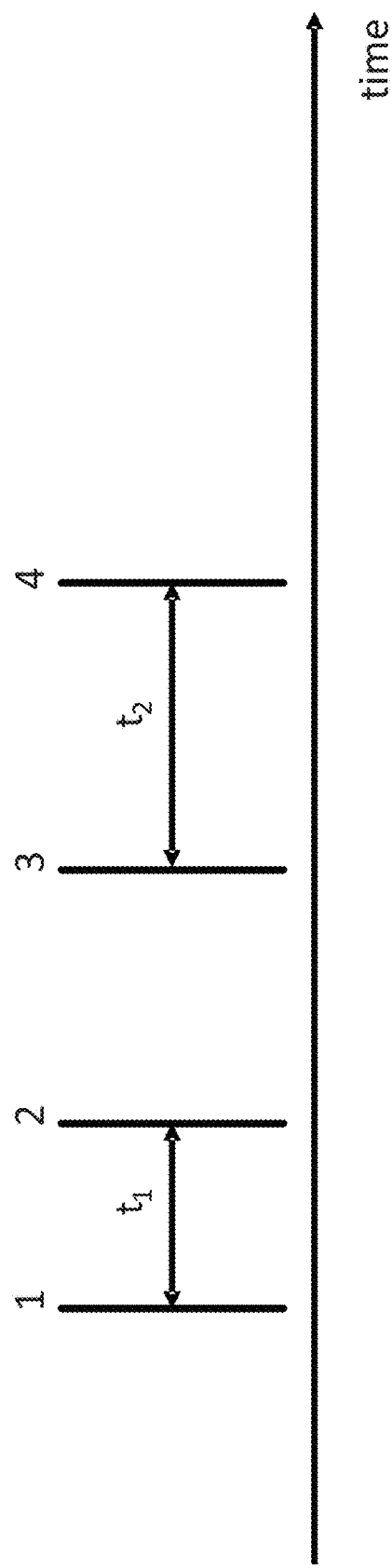
FIG. 3A illustrates the four pulse per random bit schema.

The following is a method for converting random tritium decays resulting in the emission of electrons that are being sensed by a PIN diode-type or a CCD-type built-in on-chip detector 205 discussed above to random bits:

1. After each decay of a tritium nuclei, one electron with an energy of about 5.7 KeV is emitted.
2. Each such electron creates a pulse of electrons in the detector 205 with a very typical time profile that enables the detection of just that event and not the other possible types of energetic ionizing particles hitting the detector 205.
3. The analog pulse from the detector 205 is amplified by the amplifier 210. The amplifier 210 may have a pre-amplifier.
4. The amplified signal from the amplifier 210 is filtered by a digital filter 215.
5. The filtered signal is processed by a processor 220 to determine if the signal corresponds to the electron emitted in a decay of tritium and not by other energetic ionizing particle(s). The processor 220 may include a signal processor 225 that performs this function.
6. If the signal is indeed an electron emitted in the decay of tritium, then the processor 220 starts a timer 230, which may also be part of the processor 220. The time may optimally be at a clock frequency of the order of several GHz (several times $10^9$ per second). Because electron pulses will be detected on average every microsecond ($10^{-6}$ seconds or between an average number of clock ticks of several thousands), one would have enough accuracy to detect differences of randomness of appearances of pulses in time.
7. Steps 1-6 are repeated to detect a second pulse from the subsequent decay, which triggers the processor 220 to stop the timer 230.
8. The value of the timer 230 is stored in the memory 235. This is shown as T1 in FIG. 3A.
9. The next two pulses result in another timer value (T2; FIG. 3A) to be stored in the memory 235. To generate T1 and T2, four pulses are used in FIG. 3A.
10. Two numbers (T1 and T2) stored in memory are compared—if the first is larger, then the system creates a bit with the value 1: in the other case, the value is zero. (This schema can be inverted as well). These bit values are stored in the memory 235. In the very rare situation that two numbers are exactly the same, the whole sequence may be discarded. Thus, for each random bit, four pulses are used.
11. Steps 1-10 are repeated, typically several hundred thousand times per second.
12. The system generates multi-byte numbers, typically 256 bits or 512 bits long, and these are stored in the memory bank for further use by the cryptographic client 240 of the chip 200, providing long (large) random numbers needed for the encryption of communication channels.
13. After a number is used by the cryptographic client 240, the FILO system (first in, last out) moves to the other number while the process described above adds more numbers to the memory 235 until it is filled. In such a case of filling the whole memory bank, the numbers kept longest in the memory 235 are expunged to make space for new numbers generated by the system. This capability makes the system much more resistant against hacking.

Figure 3B:
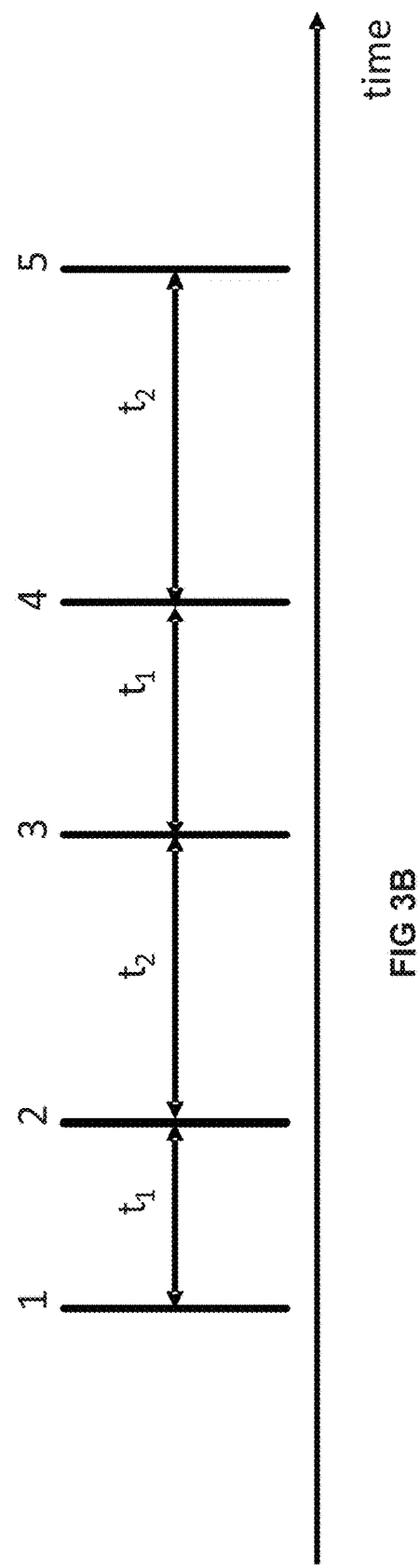
FIG. 3B illustrates the two pulse per random bit schema.

It should be noted that the system may not use four pulses per random bit. Instead, the system may be constructed as shown in FIG. 3B, where the timer resets at each pulse detection and is always counting. The benefit to this system is that it only requires two pulses per random bit. But in such a case, the two time periods are somewhat dependent on each other because they are linked by a pulse event, so the resulting string of bits may not be as random as the schema provided in FIG. 3A.

The memory can supply the necessary number of bytes (bits) on demand for e.g. the secure random encryption of communication channels (i.e., cryptographic client 240) of the device in which this specialized IC 200 is mounted or for random processes required by simulations, modelling and gaming. Additional software testing of random number sequences built into IC chips allows for real-time quality control of the random character of the bits generated—if parts of the sequence do not pass test(s), such a sequence would be removed and never used as an output. This type of proofing further improves the random character of sequences that are being generated by the chip 200.

Various example embodiments of the present apparatus, systems, and methods provide the ability to manufacture TRNG IC on the standard semiconductor production line, the only difference being that the packaging should leave as calculated above the void of the size of about 0.03 mm$^3$ with suitable openings that can be connected to the source of gaseous tritium to fill this void and after that being sealed by thermal and pressurizing means (like, for instance, a heat sealer). Otherwise, the produced IC will be very similar in shape and other characteristics to other ICs typically used in the manufacturing of consumer goods because electrons emitted during decay of tritium won't be able to penetrate packaging material (plastic) of the IC. The range of 5.7 keV electrons in a material like plastic is less than 1 micrometer. The same packaging also will be shielding the embedded detector from any external radiation of comparable or even much higher energies. Even if such high energy particles pass through the packaging plastic, they would generate different type of pulses, and these can be differentiated by filtering them from the 5.7 keV pulses that are being used to generate random numbers.

RoHS specifies maximum levels for the following 10 restricted materials. The first six apply to the original RoHS, while the last four were added under RoHS 3. Following is the RoHS list of restricted materials from http://www.rohs-guide.com/rohs-substances.htm:

Lead (Pb): <1000 ppm
  Lead is commonly used in the electrical and electronics industry in solder, lead-acid batteries, electronic components, cable sheathing and the glass of cathode-ray tubes.
Mercury (Hg): <100 ppm
  Mercury is a widely used metals in the production of electrical and electronic appliances and is concentrated in batteries, switches and thermostats, and fluorescent lamps.
Cadmium (Cd): <100 ppm
  Cadmium is used in electronic equipment, car batteries, and pigments.
Hexavalent Chromium (Cr VI)<1000 ppm
  While some forms of chromium are non-toxic, Chromium VI can produce toxic effects.
Polybrominated Biphenyls (PBB): 1000 ppm
  These are flame retardants found in electronic and electrical appliances. They have been found in indoor dust and air through evaporation from plastics.
Polybrominated Diphenyl Ethers (PBDE): <1000 ppm
  These are also flame retardants found in electronic and electrical appliances. Combustion of printed wiring boards release toxic emissions.
Bis(2-Ethylhexyl) phthalate (DEHP): <1000 ppm
  These are used to soften PVC and vinyl insulation on electrical wires.
Benzyl butyl phthalate (BBP): <1000 ppm
  These are used to soften PVC and vinyl insulation on electrical wires.
Dibutyl phthalate (DBP): <1000 ppm
  These are used to soften PVC and vinyl insulation on electrical wires.
Diisobutyl phthalate (DIBP): <1000 ppm
  These are used to soften PVC and vinyl insulation on electrical wires.

Any of the suitable technologies, materials, and designs set forth and incorporated herein may be used to implement various example aspects of the invention, as would be apparent to one of skill in the art.

Although exemplary embodiments and applications of the invention have been described herein, including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

APPENDIX

| | |
|---|---|
| Density of Tritium: | 6 g/mol |
| Volume of Tritium: | 22.4 L/mol |
| Half life of Tritium | 12.32 years |
| | 388,523,520 seconds |
| Needed Decay | 1,000,000 decays/second |
| | 1 decay/μsec |
| Radioactivity | 1,000,000 Bq |
| | $2.70 \times 10^{-5}$ Ci (with $e^-$ energy 5.7 keV per decay; 1 rad = 1 rem = 0.01 Sv; 1 rad = 0.01 J/kg) |
| Dose per body | $7.30 \times 10^{-11}$ J/(kg · s) or Gy/s |
| | $2.30 \times 10^{-3}$ Gy/year |
| | 0.23 mSv/year |
| Natural background $E_{US}$ | 3.1 mSv/year |
| % of US yearly from Tritium | 7% (if fully absorbed in lungs) |
| Tritium needed | $7.77 \times 10^{14}$ atoms |
| Tritium volume needed | $2.89 \times 10^{-8}$ L |
| | $2.89 \times 10^{-2}$ μL (mm$^3$) |
| Tritium mass needed | $7.74 \times 10^{-9}$ g |
| | $7.74 \times 10^{-3}$ μg |
| Tritium cost | $30,000.00/gram |
| Cost of Tritium needed | $0.00023 |
| Cell size [mm$^3$] | $2.70 \times 10^{-2}$ |

The invention claimed is:

1. A true random number generator (TRNG) comprising:
   a cavity filled with tritium;
   an electronic sensor constructed to detect energy from the decay of the tritium and to produce a signal for the detected energy;
   an amplifier connected to the sensor and constructed to amplify the signal;
   a filter connected to the amplifier constructed to filter the signal;
   a processor connected to the filter, constructed to perform the following steps:
   a. determine whether the signal represents decay events for tritium;
   b. set a timer to determine the time period between decay events;
   c. based on the time period in step (b), assign a value of a 0 or a 1;
   d. store the value in a memory;
   e. repeat steps (b)-(d), resulting in a string of values; and
   f. generate a true random number based on the string of values.

2. The TRNG of claim 1,
   wherein step (b) further comprises determining:
   a first time period T1 between a first pair of decay events;
   a second time period T2 between a second pair of decay events; and
   wherein step (c) further comprises comparing T1 to T2 and assigning the value based on the comparison.

3. The TRNG of claim 2, wherein the first pair of decay events and the second pair of decay events share a common decay event.

4. The TRNG of claim 1, wherein the cavity, sensor amplifier, filter and processor are formed on an integrated circuit.

5. The TRNG of claim 1, wherein the volume of tritium is less than 0.03 µL.

6. The TRNG of claim 1, wherein the maximum radioactivity of the tritium is less than $3 \times 10^{-5}$ Ci.

7. The TRNG of claim 1, wherein the processor generates an array of true random numbers.

8. The TRNG of claim 7, wherein the processor provides one of an array of true random numbers to a cryptographic client; and deletes the delivered true random number from the memory.

9. The TRNG of claim 8, wherein the one of an array of true random number provided is the oldest one in the array.

10. The TRNG of claim 7, wherein when the memory is full, the processor deletes the oldest one in the array of true random numbers.

11. The TRNG of claim 1, wherein the true random number is comprised of 256 bits or 512 bits.

12. The TRNG of claim 1, wherein the amount of tritium is sufficient to create at least one million decay events per second.

13. The TRNG of claim 1, wherein the timer has a clock frequency of at least 1 GHz.

14. The TRNG of claim 1, wherein the amplifier comprises a low noise charge-sensitive preamplifier or a pulse shaping amplifier.

15. A personal electronic device comprising:
a true random number generator comprising:
  a cavity filled with tritium;
  an electronic sensor constructed to detect energy from the decay of the tritium and to produce a signal for the detected energy;
  an amplifier connected to the sensor and constructed to amplify the signal;
  a filter connected to the amplifier constructed to filter the signal;
  a processor connected to the filter, constructed to perform the following steps:
    a. determine whether the signal represents decay events for tritium;
    b. set a timer to determine the time period between decay events;
    c. based on the time period in step (b), assign a value of a 0 or a 1;
    d. store the value in a memory;
    e. repeat steps (b)-(d), resulting in a string of values; and
    f. generate an array of true random numbers based on the string of values;
  a cryptographic client adapted to receive one of an array of true random numbers.

16. The personal electronic device of claim 15, wherein the true random number is used to encrypt a communication channel, to render computer simulations, or to render computer gaming.

17. The personal electronic device of claim 15, wherein the cavity, sensor amplifier, filter and processor are formed on an integrated circuit.

18. The personal electronic device of claim 15, wherein the volume of tritium is less than 0.03 µL.

19. The personal electronic device of claim 15, wherein the maximum radioactivity of the tritium is less than $3 \times 10^{-5}$ Ci.

20. A method of generating a true random number using tritium, the method comprising:
  a. providing a volume of tritium;
  b. detecting an energy signal from the decay of the tritium;
  c. determining whether the energy signal represents decay events for tritium;
  d. setting a timer to determine the time period between decay events;
  e. assigning a value of a 0 or a 1 based on the time period;
  f. storing the value;
  g. repeating steps (b)-(f), resulting in a string of values; and
  h. generating an array of true random numbers based on the string of values.

21. The method of claim 20,
wherein step (d) further comprises determining:
  a first time period T1 between a first pair of decay events;
  a second time period T2 between a second pair of decay events; and
wherein step (e) further comprises comparing T1 to T2 and assigning the value based on the comparison.

22. The method of claim 21, wherein the first pair of decay events and the second pair of decay events share a common decay event.

23. The method of claim 20, the method further comprising:
  i. providing one of an array of true random numbers to a cryptographic client; and
  j. deleting the delivered true random number from the memory.

24. The method of claim 23, wherein the one of an array of true random number provided is the oldest one in the array.

25. The method of claim 20, wherein the true random number is comprised of 256 bits or 512 bits.

* * * * *